United States Patent
Ahari et al.

(10) Patent No.: US 9,946,984 B2
(45) Date of Patent: Apr. 17, 2018

(54) SYSTEM AND METHOD FOR TRANSPORTING A DOCUMENT BETWEEN A FIRST SERVICE PROVIDER AND A SECOND SERVICE PROVIDER

(71) Applicant: AXINO SOLUTIONS GMBH, Aachen (DE)

(72) Inventors: Mehdi Ahari, Coventry (GB); Klaas W. Scheppink, Heerlen (NL)

(73) Assignee: AXINO SOLUTIONS GMBH, Aachen (DE)

( * ) Notice: Subject to any disclaimer, the term of this patent is extended or adjusted under 35 U.S.C. 154(b) by 13 days.

(21) Appl. No.: 14/661,398

(22) Filed: Mar. 18, 2015

(65) Prior Publication Data
US 2015/0271148 A1   Sep. 24, 2015

Related U.S. Application Data

(60) Provisional application No. 61/955,524, filed on Mar. 19, 2014.

(51) Int. Cl.
*G06Q 10/06* (2012.01)
*G06F 17/30* (2006.01)
(Continued)

(52) U.S. Cl.
CPC ... *G06Q 10/0633* (2013.01); *G06F 17/30312* (2013.01); *G06F 17/30864* (2013.01);
(Continued)

(58) Field of Classification Search
CPC ........... G06F 17/30864; H04L 63/0414; H04L 63/0428; H04L 63/08
(Continued)

(56) References Cited

U.S. PATENT DOCUMENTS 7,050,555 B2   5/2006   Zargham et al.
7,562,041 B2 *  7/2009   Chehade .............. G06Q 10/087
                                                              705/37
(Continued)

OTHER PUBLICATIONS

Bin Wu et al: "Reference Models for Saas Oriented Business Workflow Management System", Services Computing (SCC), 2011 IEEE International Conference on, IEEE, Jul. 4, 2011( Jul. 4, 2011), pp. 242-249, XP031965020, DOI: 10.1109/SCC.2011.118 , ISBN: 978-1-4577-0863-3 , the whole document p. 247, col. 1.
(Continued)

*Primary Examiner* — Hadi Armouche
*Assistant Examiner* — Hee Song
(74) *Attorney, Agent, or Firm* — Vector IP Law Group; Robert S. Babayi (57) ABSTRACT

A system and method manages workflows exchanges a document between a first server associated with a first service provider and a second server associated with a second service provider over a network. A first workflow engine associated with the first service provider is configured to apply the document to a first workflow based on a first set of rules. A second workflow engine associated with the second service provider is configured to apply the document to a second workflow based a second set of rules. The first and second workflow engines run the first workflow at first service provider asynchronous to the second workflow at the second service provider. The system and method transports a document between the first service provider and second service provider. A first server encrypts the document to create an encrypted document and append an unencrypted header to the encrypted document. The header has a pairwise relationship identifier.

14 Claims, 5 Drawing Sheets

(51) Int. Cl.
*H04L 29/06* (2006.01)
*H04L 29/08* (2006.01)
*G06F 21/60* (2013.01)
*G06Q 10/10* (2012.01)
*G06Q 30/04* (2012.01)
*G06Q 50/18* (2012.01)
*G06Q 50/32* (2012.01)
*G06Q 40/00* (2012.01)

(52) U.S. Cl.
CPC .......... *G06F 21/602* (2013.01); *G06F 21/606* (2013.01); *G06Q 10/06* (2013.01); *G06Q 10/103* (2013.01); *G06Q 30/04* (2013.01); *G06Q 40/12* (2013.12); *G06Q 50/18* (2013.01); *G06Q 50/32* (2013.01); *H04L 63/0414* (2013.01); *H04L 63/0428* (2013.01); *H04L 63/08* (2013.01); *H04L 67/10* (2013.01); *G06F 2221/2115* (2013.01)

(58) Field of Classification Search
USPC ........................................................ 713/153
See application file for complete search history.

(56) References Cited

U.S. PATENT DOCUMENTS

| | | | | |
|---|---|---|---|---|
| 8,359,400 | B2* | 1/2013 | Zargham | G06F 17/30011 709/231 |
| 2003/0110131 | A1* | 6/2003 | Alain | G06F 21/6209 705/51 |
| 2003/0200459 | A1* | 10/2003 | Seeman | G06F 21/10 726/26 |
| 2004/0034540 | A1* | 2/2004 | Chen | G06Q 10/06 705/301 |
| 2005/0096959 | A1* | 5/2005 | Kumar | G06Q 10/06316 705/7.26 |
| 2007/0130365 | A1* | 6/2007 | Rebert | H04L 67/12 709/238 |
| 2009/0168995 | A1* | 7/2009 | Banga | G06F 17/3089 380/28 |
| 2010/0299272 | A1* | 11/2010 | Lyons | G06Q 10/10 705/301 |
| 2011/0113105 | A1* | 5/2011 | Eckardt | G06Q 10/10 709/206 |
| 2011/0238975 | A1* | 9/2011 | Amemiya | H04W 4/20 713/150 |
| 2012/0110434 | A1* | 5/2012 | Gorthi | G06Q 10/06 715/234 |
| 2016/0014211 | A1* | 1/2016 | Gowri | H04W 4/003 709/227 |
| 2017/0054688 | A1* | 2/2017 | Bhattacharjee | H04L 63/0281 |

OTHER PUBLICATIONS

Hollingsworth D: "Workflow Management Coalition, The Workflow Reference Model ", Internet Citation, Jan. 19, 1995 (1995-01-190, XP002218704, Retrieved from the Internet: URL: http//www.wfmc.org/standards/docs/tc003v11.pdf[retrived on Oct. 29, 2002]the whole document.

* cited by examiner

SYSTEM AND METHOD FOR TRANSPORTING A DOCUMENT BETWEEN A FIRST SERVICE PROVIDER AND A SECOND SERVICE PROVIDER

TECHNICAL FIELD

The present invention generally relates to the field of software services and more specifically to a software service used for exchange of documents and content.

BACKGROUND OF THE INVENTION

In the field of telecommunications, interconnection refers to connections between carrier service providers for the physical linking of their networks. An interconnection between two carriers interconnects calls originating in one carrier's network and terminating in the other carrier's network and vice versa. Termination rates are rates that telecommunications carriers charge each other on a wholesale basis for terminating calls on their respective networks. An interconnection agreement between two carriers sets forth bilateral conditions for various terms, such as termination rates, capacity, carrier commitment, etc.

The explosion of voice and data traffic, as well as next generation networks, have created information overload, extra complexity and data exchange inefficiencies between the telecommunication carriers. The increasing complexity and volume of price lists, invoices, declarations, data formats and other business documents used in the interconnect business has created a paperwork nightmare for service providers. Electronic Termination Rate Agreements (known as "eTRA") have been developed by standards bodies to drive toward open standards. To further standardize practices for electronic exchange of voice and data business information among wholesale carriers, the Global Business Exchange for Telecom (GBET) has been formed as a global consortium of carriers, such as Verizon, TeliaSonera, Deutsche Telecom, etc. These carriers work cooperatively to define standards with the aim of reducing administrative cost and the ambiguity for various transactions. Also formed is the Global Settlements Carrier (GSC) Group, which works to simplify accounting and invoicing, and enable business process development for the benefit of carriers globally, including carrier's billing and settlements.

Business-to-business platforms that enable telecommunication service providers to access and share business documents among trading partners are known. One such platform is disclosed in the U.S. Pat. No. 8,359,400, which discloses a system and method for user-definable document exchange based on user-definable validation rules. Also, known are systems and methods for managing a carrier's interconnect traffic across a telecommunications network. On such system is called iXLink® developed by Telarix as disclosed in the U.S. Pat. No. 7,050,55. iXLink® creates a "Link" for relationships between pairs of carriers so that they can seamlessly communicate with an existing interconnect management system based on corresponding Link configurations. Business rules specific to each partner and/or service are applied to validate transactions, meet internal business objectives and capture errors so that time-stamped and validated documents can be exchanged electronically.

An e-contract is a contract modeled, specified, executed, controlled and monitored by a software system. Typically, a workflow management system is used for e-contract management. E-contracts are complex interrelated workflows that have to be specified to satisfy contract requirements. Frameworks to conceptualize e-contracts and model the complexity of interrelationships are known. One such framework is based on an entity-relationship (ER) model used in the design of database to reflect more precisely the properties and constraints found in more complex databases, such as in engineering design and manufacturing (CAD/CAM), telecommunications, complex software systems and geographic information systems (GIS).

Conventional manual processes for executing bilateral contracts amongst service providers result in delays due to incorrect data, back-and-forth communication, unsynchronized document exchange and conferences calls. Lack of adequate documentation has created an internal dilemma for management to account for network costs and business case justifications. As a result, the length of time and cost for getting signed and verified quotations and contracts has increased dramatically. Furthermore, conventional workflow models do not have the capabilities to handle the complexities of interrelationships in executing e-contracts amongst a large number of service providers having bilateral relationships. Therefore, there is exists a need for a system and method that facilitates exchange of documents between such service providers efficiently.

SUMMARY

Briefly according to the present invention, system and method transports a document between a first service provider having a first identifier and a second service provider having a second identifier over a network. A first server associated with the first identifier is configured to encrypt the document to create an encrypted document and append an unencrypted header to the encrypted document. The header comprises the first identifier and a pairwise relationship identifier. The pairwise relationship identifier associates the first identifier with the second identifier. A router is configured to receive the unencrypted header and the encrypted document. The router determines the second identifier based on the unencrypted header and transports the encrypted file to a second server associated with the second service provider with a transport header that is based on the second identifier. IN one embodiment, the unencrypted header further contains a version identification associated with the document.

According to some more detailed features of the present invention, a first workflow engine associated with the first service provider is configured to apply the document to a first workflow based on a first set of rules. The first workflow engine produces a first set of states associated with the document for the first workflow. A second workflow engine associated with the second service provider is configured to apply the document to a second workflow based a second set of rules. The second workflow engine produces a second set of states associated with the document for the second workflow. The first and second workflow engines run the first workflow at first service provider asynchronous to the second workflow at the second service provider. One or more shared database stores the first set of states and the second set of states of the document, where the first and second set of states have at least one common state. The document in one embodiment is an editable draft document. The document in another embodiment is a proposal document in a read-only format, where the at least one common state is indicative of at least one of withdrawal of the proposal document, rejection of the proposal document or acceptance of the proposal document.

According to other more detailed features of the present invention, a computer workstation is configured to convert the draft document in editable form into the proposal document in read-only form. A router transports the document over the network. One or more databases store a plurality of pairwise relationship records for a plurality of paired service providers. A pairwise relationship record associates a pairwise relationship identifier with identities of the first and second service providers such that the router transmits the document either to the first or second servers based on a determined identity of the first server or the second server as derived from the pairwise relationship identifier which does not reveal the identity of the first and second service providers.

According to yet other features of the invention, the first server generates a pairwise relationship request to pair the first service provider with the second service provider and the router generates the pairwise relationship identifier by authenticating an acceptance message received from the second server.

DETAILED DESCRIPTION OF THE INVENTION

The system and method described herein relates to various aspects of processing documents containing bilateral terms that are exchanged between service providers. Each service provider is paired with another service provider for the exchange of documents. As herein defined, documents can be any type of electronic file that is formatted to convey terms and condition information associated with bilateral relationships between service provider counterparties. The documents can be formatted in any known file type, such as Microsoft Word or Excel or a portable format such as Adobe PDF, etc. Examples of service providers that are paired as counterparties with each other according to the present invention include telecommunication carriers. Other types of paired service providers can be utility service providers that enter into bilateral agreements under power swaps arrangements. Many such barter deals also operate in the shipping industry where bilateral arrangements are put together to ensure mutual utilization of resources. In the international telecommunications arena one such pairing relationship could for example exist be between Verizon wireless as a first service provider in the US and Deutsche Telecom as a second service provider in Germany.

In one example embodiment, a Business Support System (BSS) embodies the various aspects of the present invention implemented on an electronic exchange and collaboration Software-as-a-Service (SaaS) platform referred to as the BSS exchange service. The BSS exchange service is centrally hosted and uses a software licensing and delivery model on subscription basis. The BSS exchange service provides an enterprise contract-modeling environment with a set of tools and features to aid creation of bilateral contract documents. One or more service providers can subscribe to the service under various subscription levels ranging from premium to basic and receive service based a corresponding subscription level.

For example, telecommunication carriers can use the service to collaborate on a full cycle of interconnection agreements from initial creation to final execution for linking one carrier's network with equipment or facilities belonging to another carrier's network. Under this arrangement, the first service provider proposes terms and conditions for the use of its network by the second provider and the second service provider proposes terms and the conditions for the use of its network by the first service provider via documents that are exchanged between the first and second service providers. Under this example, the first and second service providers can become paired telecommunication carriers with an interconnection agreement that is governed by a set of bilateral conditions, clauses and terms.

The service offered under the present invention ensures that a full cycle of document exchanges are managed and tracked. The end result of the offered service is a set of conditions which has been agreed to by both parties through separate document workflow management processes that takes place in the first and second service providers asynchronously. Subscribers' exchange documents, e.g., contracts, based on a set of industry agreed formats, such as Microsoft Excel. In one example formats are defined or otherwise structured according to a defined standard, such as those set forth by GBET (Global Business Exchange for Telecoms) and/or GSC (Global Settlements Carrier) Group referenced above.

Figures 1, 2:
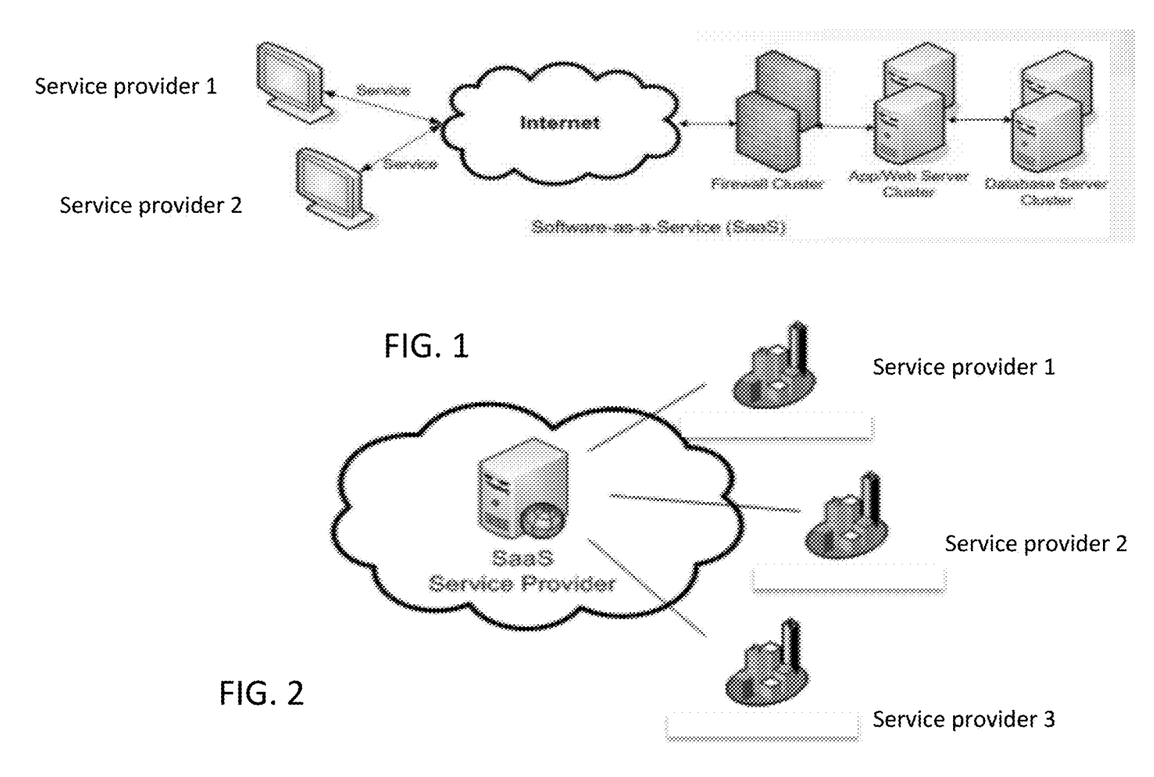
FIG. 1 shows a block diagram of a Business Support System (BSS) system implementing the present invention on a Software-as-a-Service (SaaS) platform.
FIG. 2 shows the BSS system implemented as a BSS exchange service subscribed by a plurality of service providers.

FIG. 1 shows a block diagram of a SaaS platform offering the BSS exchange service embodying various features of the present invention. The SaaS platform comprises an Application/Web Server Cluster of one or more servers, which communicates with a Database Server Cluster of one or more databases. The SaaS platform provides the BSS exchange service to the first and second service providers over the Internet via a firewall Cluster of one or more firewalls. One such the BSS exchange service is offered by Ascom under the name B2BSimpleX™ at the following domain: http://www.b2b-simplex.com.

One or more than one service providers can subscribe to the BSS service. Any service provider that subscribes to the BSS exchange service can create its own website portal, as a sub-domain of an administrator service. For example, a subscriber can access the web site at https://customername.b2b-simplex.com. Under this embodiment, if only one of the paired service providers is subscribed to the BSS service, the other service provider who is not a subscriber can still exchange contract documents and collaborate online securely via a login to the subscriber service provider's website portal. Alternatively, documents can be sent, via e-mail, to counterparties who are not subscribed to the BSS service. Under a basic subscription level, subscribers can upload and download the documents to and from the SaaS platform.

FIG. 2 shows the BSS system implemented as a cloud service subscribed by three service providers. Under this arrangement, each service provider is paired with another service provider as counterparty within the SaaS for exchange of documents containing bilateral conditions. That is, Service Provider 1 can be paired with Service Provider 2 and Service Provider 2 can be paired with Service Provider 3, while Service Provider 1 is also paired with Service Provider 3. Under a premium subscription level, anyone of the service providers can deploy the BSS exchange service in-house as an enterprise solution for management of contracts, yet seamlessly communicates with the SaaS platform for exchange and collaboration with other BSS exchange service subscribers.

The BSS exchange service enables subscribers to create scenarios to explore viability of a business deal, compare various scenarios and select one to be a candidate for exchange with a paired service provider who will be counterparty to an exchanged contract document. A service provider can enter potential cost elements and analyze the profitability criteria before proceeding further with the negotiation by submitting a proposal document. The BSS exchange service provides interfaces to the service providers to monitor a contract during its life time for profitability and take decisions as needed. The BSS exchange service can also provide subscribers with interfaces for handling exchange rates, comparison of customer's own dial codes and termination costs, a full document repository for handling agreements, a calculation engine to prepare final contract calculations, and voucher interface for ledger systems.

Figure 3:
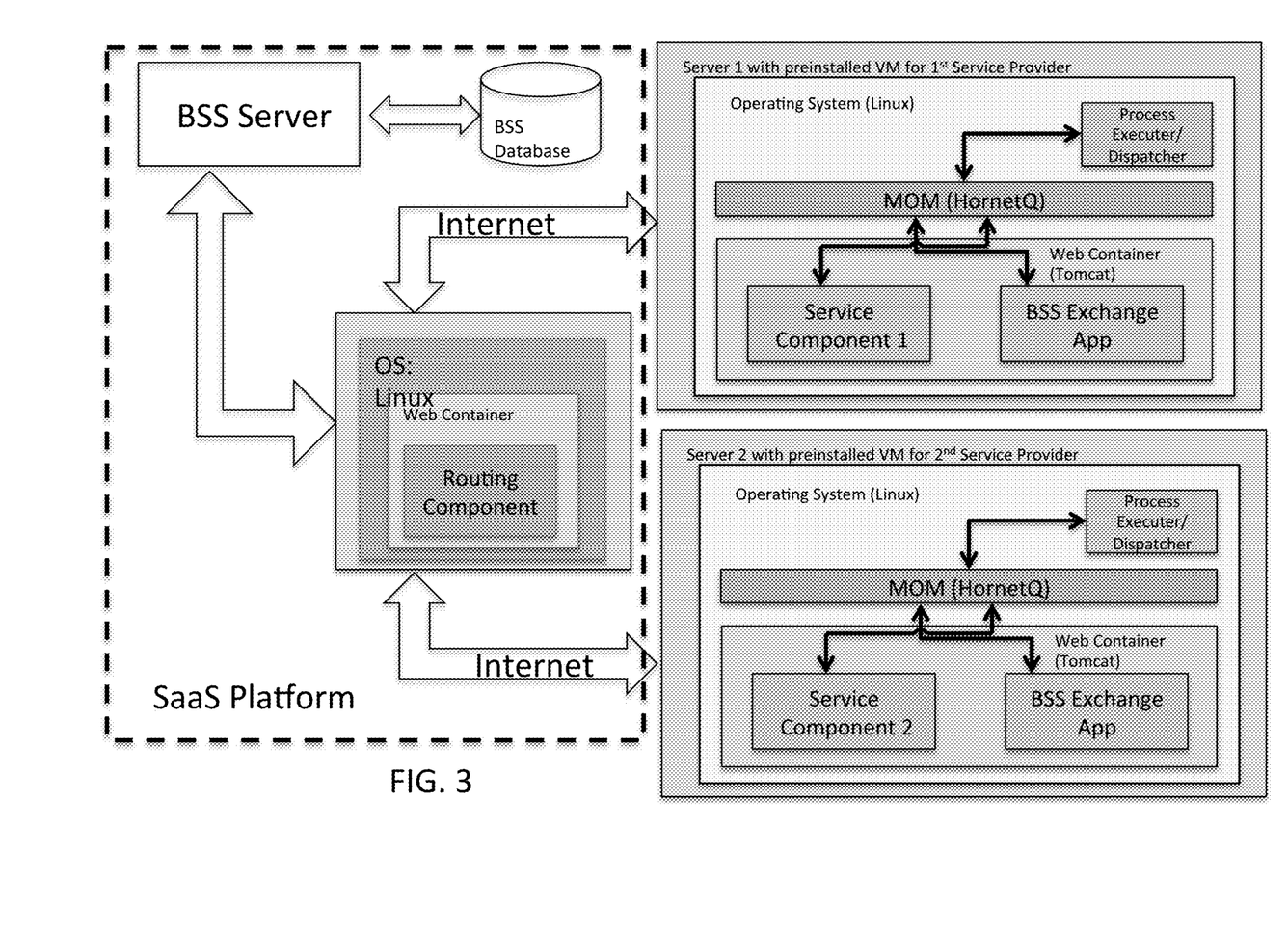
FIG. 3 shows a functional block diagram of the BSS system of FIG. 1.

FIG. 3 shows a functional block diagram of the BSS system of FIG. 1. As shown, the BSS system comprises a SaaS platform associated with the BSS exchange service that interfaces with Servers 1 and 2 of Service Providers 1 and 2. Each one of the Servers 1 and 2 executes a preinstalled virtualization software package, such as VMware Player. Each server runs virtual machines under an operating system such as Linux that execute processes for implementing the various components of the present invention. A process executer/dispatcher in each Servers 1 or 2 communicates messages with a web server and servlet container (Web Container), such as Apache Tomcat. Communications are conducted via a Message Oriented Middleware (MOM), such as HornetQ, which supports sending and receiving messages between distributed components of the BSS exchange service. Each Web Container at each server contains a Service Component (SC) that operates under the control of a corresponding BSS exchange service application. Communications between the SCs in Servers 1 and 2 are achieved via a router that is implemented as a "Routing Component (RC)". An SC, e.g., SC 1, in one subscriber service provider communicates with another SC, e.g., SC 2, in other subscriber service providers via the RC and vice versa. As such, the RC is responsible for terminating communications from one SC to another SC. Each SC sits at the "edge" of each service provider's system and encrypts outgoing documents and appends transport information in the form of headers to each encrypted document. Upon receipt of an incoming document, the SC decrypts the document and converts it to the correct deciphering version and deploys the contract for the appropriate contract relationship that exists between the service provider and counterparty.

As shown in FIG. 3, the SaaS platform of the BSS exchange service comprises a BSS database server, e.g., SQL severs, a BSS databases and the router RC. The RC communicates with the BSS database server to access the BSS database. The BSS database server executes the necessary processes for implementing the BSS exchange service components. The BSS database stores relationship information of subscribers in terms of services provider names that have interconnection relationships. The BSS database further stores user related information, e.g., username, email address, last login data and time, last IP address, last computer name, as well as log of all user activities and system messages. Also stored is information about Portal Users created on the SaaS platform.

Electronic versions of contract documents exchanged between the service providers are only stored in the BSS database before the exchange is complete, including contract related information such as Tariff models, legal terms, dial digits and destinations, Internal costs for destinations, etc. The BSS exchange service does not store the document information in the BSS database after the exchange has been completed successfully and has no access to the data being exchanged.

Communications within the BSS exchange service can have three types. The first type is a message that indicates an event state for asynchronous workflows as further described below and/or a status for communicated messages with the RC and SCs. The second type of communication is an exchanged document, which is transmitted "as is" through the BSS exchange service without any modification by the SCs or RC. The third type of communication is document version information that ensures correct versions of documents are being processed by the counterpart sender and recipient SCs. When there are document version differences between a sender and recipient SC, the version information is used to synchronize the exchanged documents based on their versions. This will ensure that the counterparts are working on the correct versions of the exchanged documents.

One aspect of the present invention relates to a system and method for exchanging documents between the pair of first and second service providers. The router, the RC, transports documents between a first server associated with the first service provider and a second server associated with the second service provider. One or more databases store a plurality of pairwise relationship records for a plurality of paired service providers. A pairwise relationship record associates a pairwise relationship identifier with identities of the first and second service providers. Upon receipt of a document associated with the pairwise relationship, the router accesses the pairwise relationship record and transmits the document either to the first or second servers based on a determined identity of the first or second server as derived from the pairwise relationship identifier.

Figure 4:
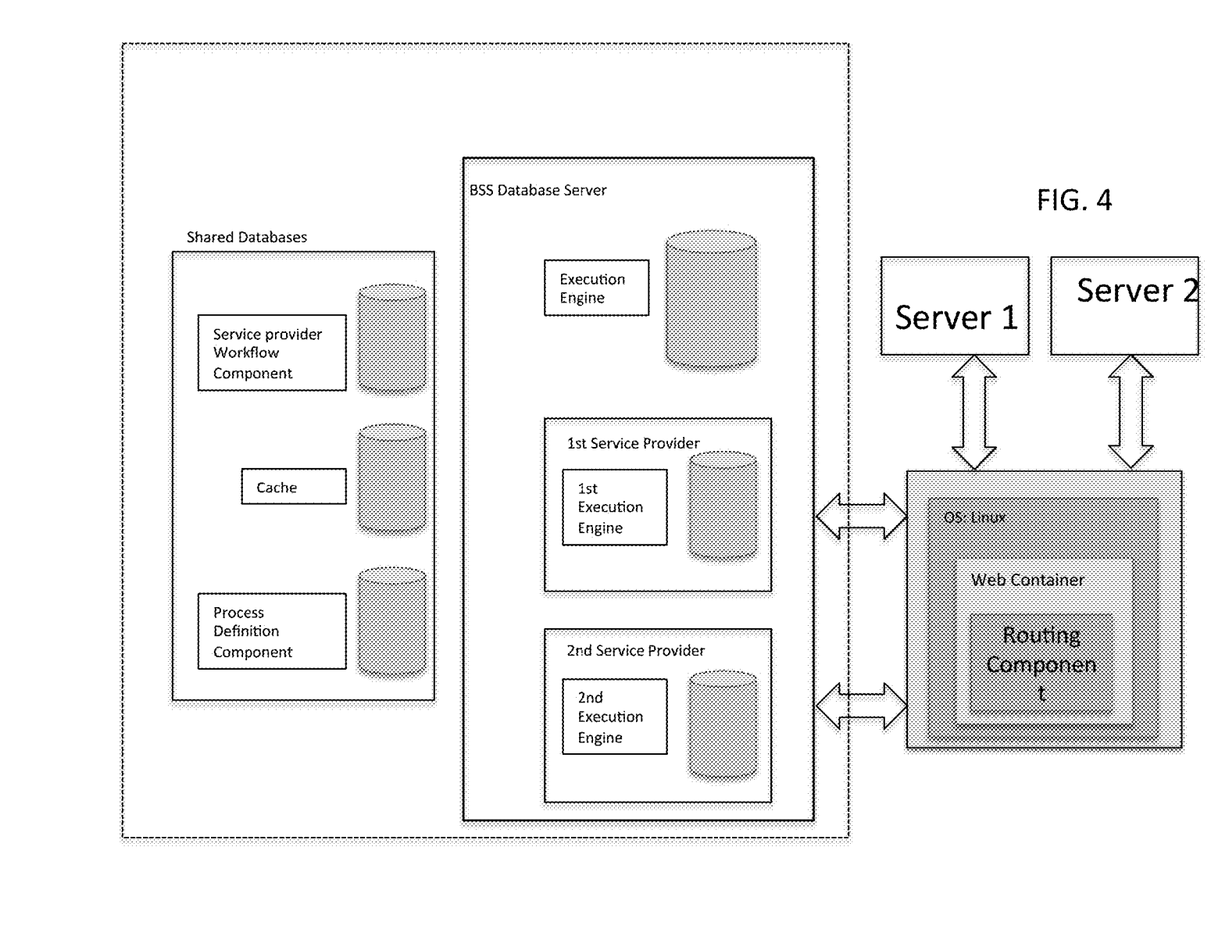
FIG. 4 shows a functional block diagram of the BSS exchange service.

FIG. 4 shows a functional block diagram of the BSS exchange service. As shown, the BSS Data Server has an execution engine for implementing the BSS exchange service. A first and a second execution engines form separate service components for the $1^{st}$ and second service providers on the SaaS platform, where information and configurations of each service provider are applied. These service components are private domains of each service provider on the SaaS platform.

A shared database includes a process definition component that defines various processes to be executed in the SaaS platform. A cache component speeds execution of processes via well-known memory management techniques. A workflow component is a software application for business process management that creates separate workflow engines for each service provider. A workflow engine facilitates the flow of information, tasks, and events. Each workflow engine allocates tasks to different executors and communicates data among participants. The workflow component can execute any arbitrary sequence of steps, monitor the state of activities in a workflow and determine which new activity to transition to according to defined processes. The actions may be anything from saving a document to sending e-mail to users or escalating overdue items to management. Further included in the workflow components are business rules engines. Each business rule engine is a software system that executes one or more business rules in a runtime environment. A business rule system enables policies and other operational decisions to be defined, tested, executed and maintained separately. Rule engines typically support rules, facts, priority, mutual exclusion, preconditions, and other functions.

One known workflow engine that can be used with the present invention is Activiti Java Workflow Engine (JWE). JWE provides generic APIs for defining and administrating business processes, using a number of components or tools. A Workflow Editor (WE) tool is used for creating, managing and reviewing process definitions. A Desktop Tool enables the simulation of processes. A Workflow Administration and Monitoring (WAM) is used for deploying and testing workflows in a workflow engine i.e. handle an engine's process definition repository by loading/unloading/updating/instantiating/monitoring process definitions and performing mappings among participant definitions and real users and among application definitions and tool agents. Various Runtime Tools provide allows users to adapt a workflow at runtime.

Figure 5:
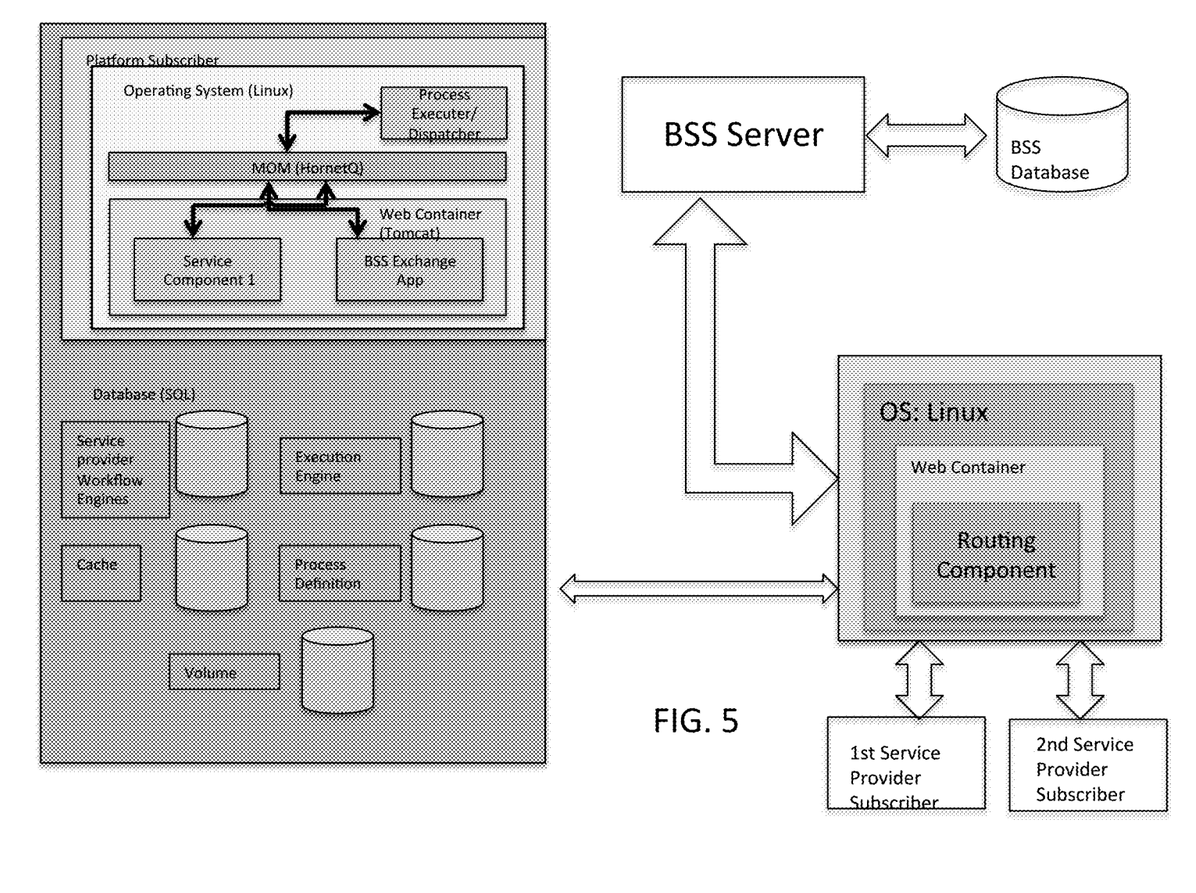
FIG. 5 shows a functional block diagram for a "platform" subscriber solution.

As stated above, the BSS exchange service has various levels of subscription for service providers. FIG. 5 shows an arrangement for a "platform" subscriber solution. Platform Solution is the enterprise in-house deployment of the BSS exchange service. It is a fully functioning enterprise solution for management of contracts, yet seamlessly communicates with the BSS exchange platform for exchange and collaboration with other BSS exchange service subscribers. Platform solution comes with additional interfacing capabilities facilitating integration to the enterprise. It has interfaces for handling exchange rates, comparison of customer's own dial codes and termination costs, a full document repository for handling agreements, a calculation engine to prepare final contract calculations, and a basic voucher interface and General Ledger systems.

The BSS exchange service is aware of the capabilities and subscribed service levels of each service provider and automatically determines the best means of communication. For example, if both service providers are subscribed to the BSS exchange service then both receive collaboration messages form the SaaS platform, and the documents are delivered "as is" awaiting the acceptance of the other party. If one party is a SaaS user and the other party is not, then the system automatically prepares a contract document covering both sides of the contract, places an event state information in the contact document, and sends it via email to the recipient. The BSS exchange service provides visual information to subscribers about the capability of each of their counterparts, for example, by means of a simple traffic light. Green color denotes a fully functioning SaaS or Platform user, whereas an Amber color denotes a basic user with somewhat limited collaboration capabilities, but a full exchange capability.

Establishing a relationship between two service providers requires exchanging relationship request messages. One aspect of the present invention relates to creating a pairwise relationship between the first and second service providers by authenticating an acceptance message and generating a pairwise relationship identifier at a router, such as the RC shown in FIG. 3. The pairwise relationship is created based on a pairwise relationship request generated by a first server, i.e., Sever 1, which is associated with the first service provider to pair with the second service provider. The router generates a pairwise relationship identifier by authenticating an acceptance message received from a second server, i.e., Server 2, which is associated with the second service provider. The authentication may involve the use of a Public Key Infrastructure (PKI) or any other type of trusted encryption/decryption process. The pairwise relationship identifier is generated in a manner that does not reveal the identities of the first and second service providers. One or more databases, e.g., the BSS databases, accessible by the router RC store a plurality of pairwise relationship records for pairs of service providers, where a pairwise relationship record associates or otherwise links the pairwise relationship identifier with identities of the first and second service providers. Under this arrangement, the RC has access to a list of detailed pair wise relationship between each subscriber and their counterpart.

More specifically, when a service subscriber sets up a relationship with a new counterpart, then a message is sent to the RC, where the RC itself is the recipient. The RC authenticates the message by deciphering the message, which contains information about a new relationship that is going to exist between the first and second service provider. Similar is the case for the severance of a relationship, whereby the RC will block a particular counterpart relationship. When a subscriber sets up a portal, a new counterpart is registered. The RC receives a registration request, and determines that the recipient (counterpart) also resides on the same environment. This mechanism ensures that every time there is a communication between a subscriber and its portal user counterpart, mode of communication remains consistent.

Each SC is responsible for preparation of information for transmission. Subscribers communicate with counterparts by sending commercial models, or event information such as accepting a proposal, or rejecting or withdrawing an offer or proposal. The data to be exchanged does not have to be complete. Indeed BSS exchange service allows subscribers to create incomplete commercial models, with inconsistencies and still able to share that with their counterparts in a "draft" mode. This method is equivalent to the current practice in the industry where ideas are shared first and as they become concrete they form an offer to be considered seriously. So, in essence the BSS exchange service can transmits information "as is" without validation.

Each service provider is responsible fort its own proposed or offered terms and conditions in its part of the contract document. Each service provider can share its own version of the contract document part with a counterparty service provider. The version that is exchanged can be in many different states. For example, if account managers just want to explore some ideas with the counterparts, they can create a "Draft" contract and share it. A counterpart can also do the same or create a pseudo formal "Proposal". A document in "Proposal" form can be reviewed, rejected, withdrawn, or turned into an "Offer". Once in offer state, each party can peruse their own internal approval processes. The BBS exchange service provides workflows to manage the business processes. The BSS exchange service has the ability to integrate electronic signature, such as DocuSign or automatic insertion of electronic signatures, as part of the final signature stage.

Another aspect of the present invention relates to transporting documents between the pair of first and second communication service providers. A first server, Server 1, associated with the first service provider encrypts a document to be transported to a second server, Server 2, associated with the second service provider. The first server transmits the encrypted file to a router, the RC, with a header appended to the encrypted document. The header contains a pairwise relationship identifier that associates the identity of the first service provider with the identity of the second service provider. Also included in the header is the document version information for the encrypted document. The router determines the identity of the second service provider based on the pairwise relationship identifier contained in the header and transports the encrypted file preferably over a secure transport protocol, such as HTTPS, to the second server with a transport header that is based on the identity of the second service, e.g., IP address of the second serer. The encrypted document is received over the secure transport at the addressed SC, where it is decrypted/deciphered. The version information maintain version synchronicity at the counterparty service providers. Once a document is ready to be sent to counterparty, additional information is added as header for the transport purposes. These information include version identifier and a routing identifier, to be deciphered at the RC for identifying the source SC and destination SC.

When the RC receives a request for termination of a message or document for a source SC, it checks the header information and then directs the content to a destination SC. The destination SC is responsible for deciphering the document, and performing necessary validation to ensure that when there are specific version changes all necessary data transformation between versions can occur without the source SC needing to query the destination SC to verify the version and before encryption and transmission to the destination SC.

For example, when party A, i.e., the first service provider, sends a "Proposal" document to Party B, i.e., the second service provider, the workflow state is recorded in each subscribers local workflow stack as "Shared Proposal". A receiving SC only unpacks and deciphers the "Shared Proposal" document. Once unpacked, together with the document workflow state information that identifies where the workflow fits a copy of the document is created and the content is inserted into. This copy will remain as a "Copy" and forms part of the audit trail of the negotiation. As negotiations progress, each party are able to create their own version of the Shared or Local documents, incorporate their contractual components with their counterpart, and evaluate the commercial conditions. At any and all stage of the negotiations either party independent of the other can reject a document, or withdraw their submission. During negotiation amongst the parties, the workflow state information is also transported along with the content every time a document is shared. The SC plays no part in the workflow. An identification code identifies where a content is in the sequence. If party A shares a contract document X with party B, at point of sharing the document has a sequence ID and internal contract version number for contract X. When a new content arrives from Client B, the service identifies that it belongs to contract X, and that this has arrived and a new version is assigned to it, and the Inter-company workflow state is entered for this version of the contract X in the workflow stack of Contract X.

Still another aspect of the present invention relates to asynchronous workflow management for processing documents at a pair of service providers. Under this aspect, a draft document in editable/writeable form is converted into a proposal document, which may be in an un-editable/read-only form. A first workflow engine is configured for a first workflow associated with the first service provider with a first rule engine. A second workflow engine is configured for a second workflow associated with the second service provider with a second rule engine. The first workflow engine applies the proposed document to the first workflow and the second workflow engine applies the proposed document to the second workflow, which runs asynchronous to the first workflow. The first workflow engine produces a first set of internal states associated with the proposed document for the first work flow and second workflow engine produces a second set of internal states associated with the proposed for the second work flow. A database stores the first set of states and the second set of states of the proposed document, where the first and second set of states have at least one common state, e.g., withdrawn, rejected, e-offer or e-signed.

Each workflow engine verifies current status by checking whether a command is valid in executing a task and determines user authority by checking if a current user is permitted to execute the task. After passing the previous two steps, workflow engine begins to evaluate condition script in which two processes are carried out, if the condition is true, workflow engine execute the task, and if execution successfully complete, it returns the success, if not, it reports the error to trigger and roll back the change.

The BSS exchange service provides workflows for verification and approval of contract documents in the participating party's organization. Although there is a degree of commonality across service providers business overall, each Service provider sets up its own workflow internally. An administrator of each service provider configures corresponding workflow engine, where each service provider can customize the workflows to mimic its own organizational business processes. A typical workflow is the situation when an account manager decides on a certain volume of traffic to be sent to the counterpart, as part of internal finalization of the contract, this volume typically has to be approved by the engineering/capacity-management teams. So, a workflow request is generated towards the responsible group. This group will see a task in their "to-do" list (and receive an email) to approve or reject the request.

The internal workflows, i.e., Intra-company workflows, are stored as part of each subscriber service provider's private domain within the SaaS platform, and any inter-company workflow step is also stored in a workflow information data storage area. Typically workflows of each service provider do not have do not have a direct correlation and they only intersect at various points. For example, at "Draft" stage of a contract an account manager has a free hand in exchanging information with counterpart (as there is no binding commitment is in place). However, once after one or more exchanges with counterpart in "Draft", one Account Manager decides to take it further. To take it further the account manager requires approval from Capacity planning manager, Dial code manager, and maybe the commercial manager for verification of the profitability. So the account manager can trigger an internal workflow requesting approval. Once all 3 approvals are obtained the account manager can then change the status of the "Draft" contract document to "Proposal" or "Offer" document and share that with a paired counterparty service provider. The counterparty service provider will start it own approval process after receiving the "Proposal" or "Offer" document.

Figure 6:
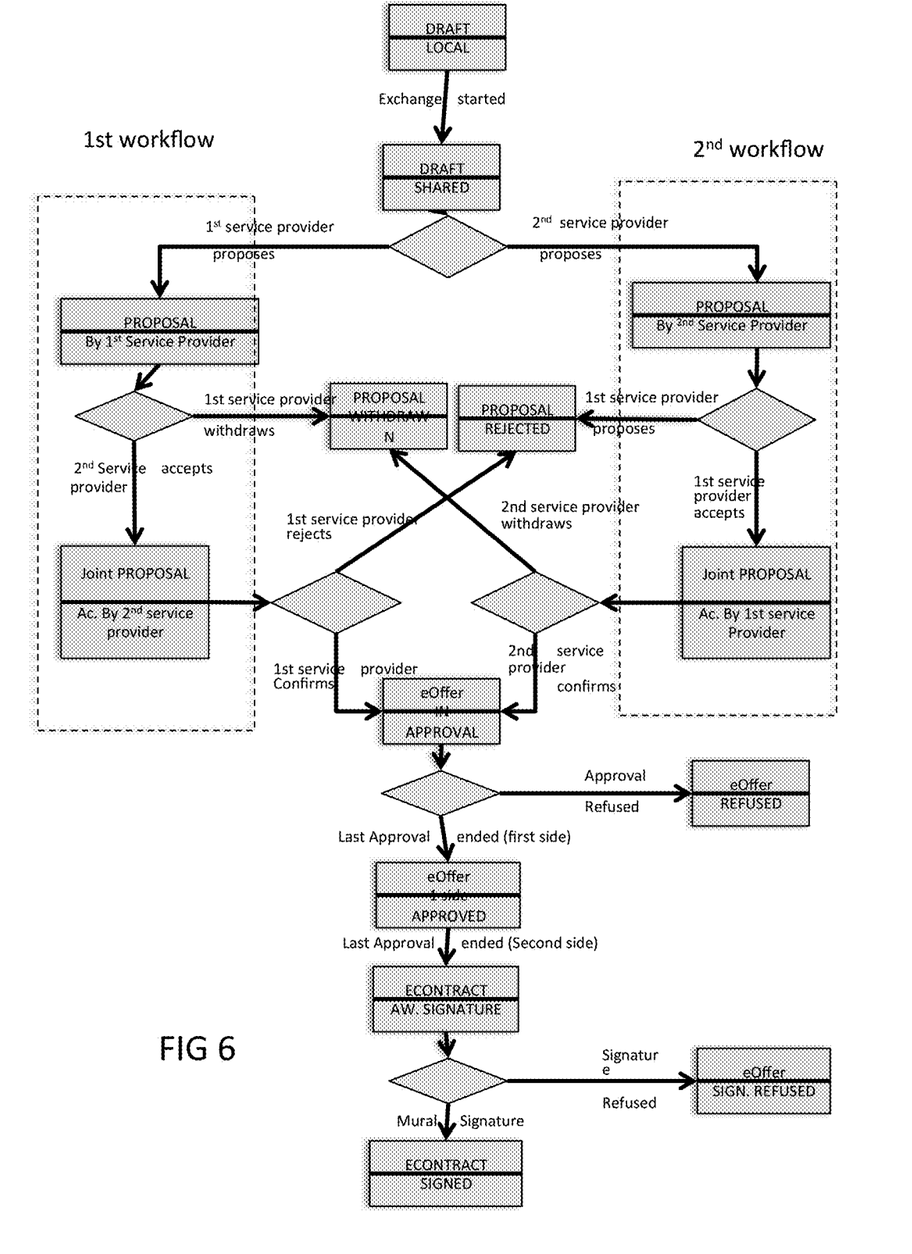
FIG. 6 shows a flow chart implementing asynchronous workflows for exchange of documents between a pair of service providers.

FIG. 6 shows a flow chart implementing asynchronous workflows for exchange of documents between a pair of service providers. During collaboration, each service provider receives an event message when the counterpart makes a change or changes the state of a contract document. These changes are transparent, and the two parties in the negotiation are connected seamlessly, as if they are part of the same team, encapsulated in the negotiation process. The BSS exchange service also manages changes to contract documents during their lifetime. Such changes require a formal approval process both internally as well as between the contracting parties. Changes can be anything ranging from changes in the commitments, termination rates, exchange rates, volumes, destination and dial codes, or other contractual components enforced in the contract between two parties (for example changes to the pre-payment amount, or even changes to dispute conditions). All such changes lead to a formal negotiation process and as such a new contract version is created and goes through approval processes.

As a contract for a contracting period is setup, and the user starts creating a tariff structure and all associated parameters (dial codes, destination, volumes, cost, . . . ), the tariff structure is set to "Draft" and a unique version number is associated with it. Version number or VersionID is issued from a number pool and is not related to a particular contract. Users also have the possibility of creating several alternative tariff structures under a contract. This arrangement allows for simulating alternative pricing, costing and contracting conditions to identify a most profitable/viable alternative. All these different versions would be in Draft mode and each have a unique version identifier.

Once Party A decides to share one of these Draft tariff models with Party B, then the Party B would receive the document/content in their system and a locally unique version number is given in the Party B system. For example, Party A version may have an identifier e.g. 1126, but when it reaches Party B, it is given a different identifier using the Party B version number pool e.g. 5782. Versions occur at every stage of collaboration between the two parties. Party A may share several drafts or Proposals with Party B, and accept or reject at various points.

At any stage of collaboration there is only one "current" version under consideration to ensure that no out of synchronization discussions and collaborations occur, and both parties can refer to one common and current version even though each party may have its own versions of the contract document or may have shared with other party one or more versions. All these versions of the contract are all available for inspection. For example, let's assume Party A sends to Party B a document in the status of "Proposal". Party B has the option of working on this shared proposal or create something completely different. If Party B work on something completely different and decides to share that with Party A, then the previous shared Proposal from party A is rescinded. Equally, if Party A decides after sharing a Proposal, to effectively abandon it, and create a new one, it can do so and the latest shared document becomes the "current" version. Such management of regency of communication taking prevalence ensures that both parties always share a common ground. Additionally, any other intra-company approval workflows and tasks which may have been initiated or completed with respect to a "Previous" version of a shared proposal become in effect null and void and the system would trigger new approval request in view of the latest proposal. In one embodiment, intra-company workflows for seeking approvals are initiated at "eOffer" stage and not before, as it could potentially lead to multiple approval tasks, for contracts that may not become a firm and binding one.

To ensure that when Party A and Party B communicate together, there is a common reference between the two parties, a global pairwise relationship identifier is generated for the two parties to act as a common reference for the two. This unique identifier is made up of several constituents. For example, for a contract between Verizon and Deutsche Telekom for Q1 2015, the unique common identifier would look like Ver_DT_Q1_2015_eTRA_12345. This facilitates the two parties to have a common reference identifier, when for example, discussing the document over the phone.

The BSS exchange service allows service providers to exchange collaboration messages in content neutral manner. Many contracts between two parties require specific set of conditions over and above the normal terms of business. These set of conditions attributed to a contract vary in the context of relationship of one carrier to another. To overcome the variations, the BSS exchange service provides a tool, which allows the subscribers to define their own set of conditions or attributes and attach it to one or more set of contract documents. A generic attribute template designer stored in the database allows users to create/store and share custom attributes. These information are transmitted and exchanged transparently. Each party in the contract can create their own set of conditions or attributes independent of the counterpart. The tool combines these conditions or attributes at Proposal, Offer, or Contract stages to provide a common set of attributes that governs the overall contract between the two parties. For subscribers that communicate documents outside of the SaaS platform, a tool translates automatically the subscriber defined set of conditions (which contains editable fields, selection from drop down lists etc.), to an exacting set of conditions in and drop down lists for example in Excel.

From the foregoing it would be appreciated that the system and method of the present invention provides a streamlined approach to exchange of terms and conditions that details the contractual obligations of the parties in a contract. As such, the end result of the services offered in the exchange result in a set of commercial conditions which has be agreed by both parties to be considered as an "Agreed" contract.

The invention claimed is:

1. A system comprising one or more servers comprising hardware configured to transport a document between a first service provider having a first identifier and a second service provider having a second identifier over a network of computing devices, comprising:
 a first server associated with the first identifier configured to:
  encrypt the document to create an encrypted document; and
  append an unencrypted header to the encrypted document, said header comprising the first identifier and a pairwise relationship identifier, wherein the pairwise relationship identifier associates the first identifier with the second identifier;
 a router configured to receive the unencrypted header and the encrypted document, wherein the router determines the second identifier based on the unencrypted header and transports the encrypted file to a second server associated with the second service provider with a transport header that is based on the second identifier, wherein the pairwise relationship identifier does not reveal the identity of the first and second service providers,
 a first workflow engine associated with the first service provider configured to apply the document to a first workflow based on a first set of rules; wherein the first workflow engine produces a first set of states associated with the document for the first workflow;

a second workflow engine associated with the second service provider configured to apply the document to a second workflow based a second set of rules, the second workflow engine producing a second set of states associated with the document for the second work flow, wherein the first and second workflow engines run the first workflow at first service provider asynchronous to the second workflow at the second service provider; and one or more shared database stores the first set of states and the second set of states of the document, where the first and second set of states have at least one common state, wherein the at least one common state is indicative of at least one of withdrawal of the proposal document, rejection of the proposal document or acceptance of the proposal document.

2. The system of claim 1, wherein the unencrypted header further contains a version identification associated with the document.

3. The system of claim 1, wherein the document is an editable draft document.

4. The system of claim 1, wherein the document is a proposal document in a read-only format.

5. The system of claim 1 further including a computer workstation configured to convert a draft document in editable form into a proposal document in read-only form.

6. The system of claim 1 further comprising one or more databases store a plurality of pairwise relationship records for a plurality of paired service providers, a pairwise relationship record associating the pairwise relationship identifier with the first and second identities, wherein the router transmits the document either to the first or second servers based on a determined identity of the first server or the second server as derived from the pairwise relationship identifier.

7. The system of claim 1, wherein the first server generates a pairwise relationship request to pair the first service provider with the second service provider, wherein the router generates the pairwise relationship identifier by authenticating an acceptance message received from the second server.

8. A method for transporting a document between a first service provider having a first identifier and a second service provider having a second identifier over a network, comprising:

configuring a first server associated with the first identifier to:
encrypt the document to create an encrypted document; and
append an unencrypted header to the encrypted content file, said header comprising the first identifier and a pairwise relationship identifier, wherein the pairwise relationship identifier associates the first identifier with the second identifier; and receiving the unencrypted header and the encrypted document at a router, wherein the router determines the second identifier based on the unencrypted header and transports the encrypted file to a second server associated with the second service provider with a transport header that is based on the second identifier, wherein the pairwise relationship identifier does not reveal the identity of the first and second service providers, the method further including the steps of configuring a first workflow engine associated with the first service provider to apply the document to a first workflow based on a first set of rules; wherein the first workflow engine produces a first set of states associated with the document for the first workflow;

configuring a second workflow engine associated with the second service provider configured to apply the document to a second workflow based a second set of rules, the second workflow engine producing a second set of states associated with the document for the second work flow, wherein the first and second workflow engines run the first workflow at first service provider asynchronous to the second workflow at the second service provider; and storing in one or more shared database the first set of states and the second set of states of the document, where the first and second set of states have at least one common state, wherein the at least one common state is indicative of at least one of withdrawal of the proposal document, rejection of the proposal document or acceptance of the proposal document.

9. The method of claim 8, wherein the unencrypted header further contains a version identification associated with the document.

10. The method of claim 8, wherein the document is an editable draft document.

11. The method of claim 8, wherein the document is a proposal document in a read-only format.

12. The method of claim 8 further converting a draft document in editable form into a proposal document in read-only form.

13. The method of claim 8 further storing a plurality of pairwise relationship records for a plurality of paired service providers in one or more databases, a pairwise relationship record associating the pairwise relationship identifier with the first and second identities, wherein the router transmits the document either to the first or second servers based on a determined identity of the first server or the second server as derived from the pairwise relationship identifier.

14. The method of claim 8, wherein the first server generates a pairwise relationship request to pair the first service provider with the second service provider, wherein the router generates the pairwise relationship identifier by authenticating an acceptance message received from the second server.

\* \* \* \* \*